US012544509B2

(12) United States Patent
Abal et al.

(10) Patent No.: US 12,544,509 B2
(45) Date of Patent: Feb. 10, 2026

(54) INFUSION PUMP SENSING SYSTEM (71) Applicant: CareFusion 303, Inc., San Diego, CA (US)

(72) Inventors: Daniel M. Abal, San Diego, CA (US); Brendan John Burgess, Poway, CA (US); Ramkumar Subramanian, San Diego, CA (US)

(73) Assignee: CAREFUSION 303, INC., San Diego, CA (US)

( * ) Notice: Subject to any disclaimer, the term of this patent is extended or adjusted under 35 U.S.C. 154(b) by 1186 days.

(21) Appl. No.: 17/321,127

(22) Filed: May 14, 2021

(65) Prior Publication Data

US 2021/0369962 A1 Dec. 2, 2021

Related U.S. Application Data (60) Provisional application No. 63/030,742, filed on May 27, 2020.

(51) Int. Cl.
*A61M 5/168* (2006.01)
*A61M 5/142* (2006.01)
*A61M 5/172* (2006.01)

(52) U.S. Cl.
CPC ........ *A61M 5/16831* (2013.01); *A61M 5/142* (2013.01); *A61M 5/16881* (2013.01);
(Continued)

(58) Field of Classification Search
CPC .............. A61M 5/16831; A61M 5/142; A61M 5/16881; A61M 2005/14208; A61M 2005/16868; A61M 2005/16872; A61M 2205/18; A61M 2205/332; A61M 2005/16863; A61M 5/172;
(Continued)

(56) References Cited

U.S. PATENT DOCUMENTS

| 5,217,355 A | 6/1993 | Hyman et al. |
| 5,244,463 A * | 9/1993 | Cordner, Jr. .......... A61M 5/142 604/67 |

(Continued)

FOREIGN PATENT DOCUMENTS

| JP | 2014-087450 A | 5/2014 |
| JP | 2016-527940 A | 9/2016 |

(Continued)

OTHER PUBLICATIONS

International Search Report and Written Opinion for Application No. PCT/US2021/033250, dated Sep. 17, 2021, 15 pages.

(Continued)

*Primary Examiner* — Jason E Flick
(74) *Attorney, Agent, or Firm* — MASCHOFF BRENNAN (57) ABSTRACT

Force sensing assemblies for an infusion pump are provided. A force sensing assembly includes a processor and an occlusion sensor coupled to the processor. The occlusion sensor is positioned opposed to an occluder valve when the platen is closed. The force sensing assembly measures one or more forces exerted on a fluid tube during a pump cycle. Infusion pump assemblies, methods of operating an infusion pump with a force sensing assembly, systems for controlling an infusion pump and an infusion device are also provided.

18 Claims, 7 Drawing Sheets

(52) U.S. Cl.
CPC ............ *A61M 2005/14208* (2013.01); *A61M 2005/16868* (2013.01); *A61M 2005/16872* (2013.01); *A61M 2205/18* (2013.01); *A61M 2205/332* (2013.01)

(58) Field of Classification Search
CPC ...... A61M 5/14228; A61M 2205/3317; A61M 2205/14; A61M 2205/3334; A61M 5/16804; A61M 5/16854; F04B 43/082; F04B 43/12; F04B 43/1207
See application file for complete search history.

(56) References Cited

U.S. PATENT DOCUMENTS

| | | | | |
|---|---|---|---|---|
| 5,658,133 | A * | 8/1997 | Anderson | A61M 5/172 73/19.1 |
| 6,280,408 | B1 | 8/2001 | Sipin | |
| 2002/0165503 | A1 | 11/2002 | Morris et al. | |
| 2003/0214412 | A1 * | 11/2003 | Ho | A61M 5/16854 340/611 |
| 2010/0106082 | A1 | 4/2010 | Zhou | |
| 2017/0028140 | A1 | 2/2017 | Toshima | |

FOREIGN PATENT DOCUMENTS

| | | |
|---|---|---|
| JP | 2017-029304 A | 2/2017 |
| WO | WO2014210055 A1 | 12/2014 |

OTHER PUBLICATIONS

Japanese Office Action for Application No. 2022-572534, dated Feb. 14, 2025, 5 pages including translation.
Chinese Office Action for Application No. 202180038265.9, dated Mar. 27, 2025, 6 pages including translation.
Chinese Office Action for Application No. 202180038265.9, dated Aug. 2, 2025, 12 pages including translation.
Japanese Office Action for Application No. 2022-572534, dated Jul. 11, 2025, 5 pages including translation.
Mexican Office Action for Application No. MX/a/2022/014698, mailed Oct. 9, 2025, 14 pages including translation.
Chinese Office Action for Application No. 202180038265.9, dated Oct. 17, 2025, 13 pages including translation.

* cited by examiner

INFUSION PUMP SENSING SYSTEM

TECHNICAL FIELD

This application claims the benefit of priority under 35 U.S.C. § 119 to U.S. Provisional Patent Application Ser. No. 63/030,742 entitled "INFUSION PUMP SENSING SYSTEM" filed on May 27, 2020, the disclosure of which is hereby incorporated by reference in its entirety for all purposes.

TECHNICAL FIELD

The present disclosure generally relates to an infusion pump sensing system, in particular a film element force sensor system.

BACKGROUND

Flexible tubing for medical fluid transfusion has been widely used in the medical field for intravenous (IV), epidural, and enteral applications. Such tubing may be used in a typical infusion pump, such as a large volume pump (LVP). Infusion pumps typically use a linear peristaltic or similar type of mechanism that creates the pumping action by way of squeezing the IV tubing to generate the pressure that causes the IV medication to flow through the IV tubing and ultimately into the patient. The squeezing action can also be used as a mechanism to close off the flow. This is used in pumping mechanisms that operate in a cyclical fashion by operating in a cycle that includes a filling portion and a delivery portion. In these instances the pumping mechanism uses valving that includes an intake or fill valve, and an outflow or delivery valve. Typical operation of the pumping mechanism generally requires complete closure of these valves when they are not expected to be open. Incomplete closure can produce leakage, which can produce uncontrolled flow resulting in either not enough medication or too much medication being delivered to the patient.

In order to verify that the valving mechanism is properly closing in an infusion pump, the amount of force that is needed to be applied to the tubing to ensure that it is pinched and closed completely is very important. For this reason, it is desirable to verify that the valving mechanism is operating as expected.

SUMMARY

One or more embodiments provide an infusion pump assembly, according to aspects of the disclosure. The infusion pump assembly includes a body, a door, a tubing pathway configured to receive a fluid tube, a pumping mechanism having an occluder valve, a platen and a force sensing assembly. The force sensing assembly includes a processor and an occlusion sensor coupled to the processor, the occlusion sensor disposed on the platen in a position opposed to the occluder valve when the platen is closed. The force sensing assembly is configured to measure one or more forces exerted on the fluid tube during a pump cycle.

One or more embodiments provide a force sensing assembly for an infusion pump, according to aspects of the disclosure. The force sensing assembly includes a platen, upper and lower occlusion sensors each disposed on the platen in a position configured to oppose a corresponding upper and lower occluder valve of an infusion pump when the platen is in a closed position, and a processor electronically coupled to the occlusion sensor. The force sensing assembly is configured to measure one or more forces exerted on a fluid tube disposed between the occlusion sensor and the occluder valve during a pump cycle.

One or more embodiments provide a method of operating an infusion pump with a force sensing assembly, according to aspects of the disclosure. The method includes receiving a fluid tube in a fluid flow pathway of the infusion pump; causing the infusion pump to perform one or more pumping cycles, wherein each pumping cycle forces fluid flow from an output end of the fluid tube by squeezing a portion of the fluid tube; measuring, by the force sensing assembly, a force on the fluid tube during the pumping cycle; comparing the measured force against to an established occlusion force value threshold; and generating a variance signal if a variation outside of the established occlusion force value threshold is detected.

One or more embodiments provide a for controlling an infusion pump with a force sensing assembly, according to aspects of the disclosure. The system includes a force sensor disposed on a platen of an infusion pump in a position opposed to a pumping element of the infusion pump, wherein the force sensor is configured to generate measurements of one or more forces exerted during a pump cycle, and a controller including a processor configured by specific computer-executable instructions. The instructions receive, from the force sensor, a first force measurement value; determine the first force measurement value corresponds to a force value threshold; generate a control message based at least on the first force measurement value; and cause the infusion pump associated with the force sensor to adjust operation by at least transmitting the control message to the infusion pump.

One or more embodiments provide a for an infusion device, according to aspects of the disclosure. The infusion device includes a transceiver for exchanging messages with a controller, a platen, a pumping element, a force sensor disposed on the platen in a position opposed to the pumping element, wherein the force sensor is configured to generate measurements of one or more forces exerted during a pump cycle, a non-transitory computer-readable data store configured to store specific computer-executable instructions, and a processor in communication with the non-transitory computer-readable data store, the processor configured to execute the computer-executable instructions. The instructions cause the transceiver to transmit a first message to the controller, the first message including a force measurement generated by the force sensor; receive, from the controller, a control message for adjusting an operational state of at least one hardware element of the infusion device; and adjust the operational state of the at least one hardware element based at least in part on the control message.

The foregoing and other features, aspects and advantages of the disclosed embodiments will become more apparent from the following detailed description and accompanying drawings.

BRIEF DESCRIPTION OF THE DRAWINGS

The accompanying drawings, which are included to provide further understanding of the disclosure and are incorporated in and constitute a part of this specification, illustrate embodiments of the disclosure and together with the description serve to explain the principles of the disclosure.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Figure 1:
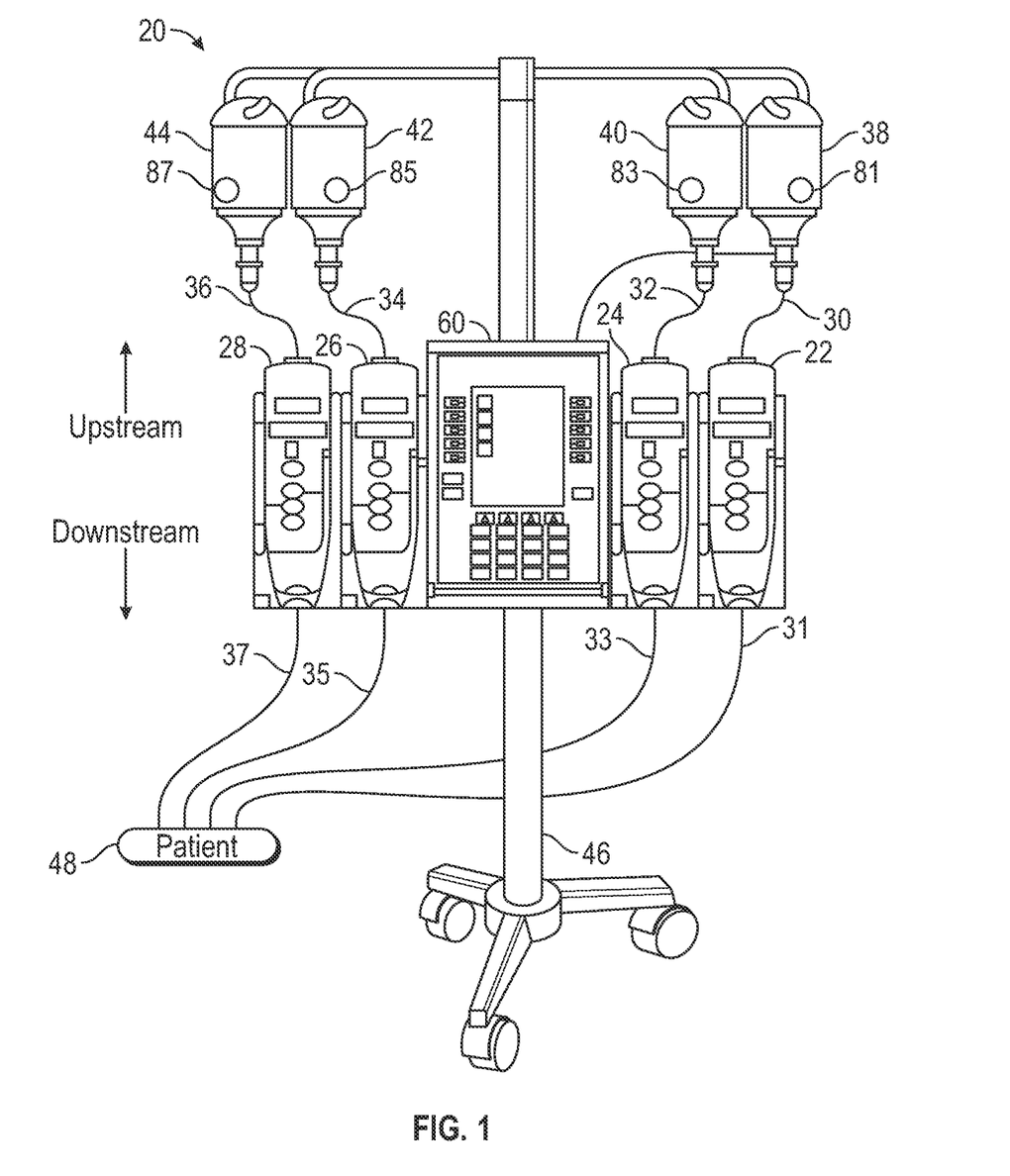
FIG. 1 depicts a front view of an example patient care system having four fluid infusion pumps, each of which is connected to a respective fluid supply for pumping the contents of the fluid supply to a patient, according to some aspects of the disclosure.

Referring now in more detail to the drawings in which like reference numerals refer to like or corresponding elements among the several views, there is shown in FIG. 1 a patient care system 20 having a controller 60 (e.g., control interface) and four infusion pumps 22, 24, 26, and 28, each of which is fluidly connected with an upstream fluid line 30, 32, 34, and 36, respectively. Each of the four infusion pumps 22, 24, 26, and 28 is also fluidly connected with a downstream fluid line 31, 33, 35, and 37, respectively. The fluid lines can be any type of fluid conduit, such as an IV administration set, through which fluid can flow through. It should be appreciated that any of a variety of pump mechanisms can be used including syringe pumps.

Fluid supplies 38, 40, 42, and 44, which may take various forms but in this case are shown as bottles, are inverted and suspended above the pumps. Fluid supplies may also take the form of bags or other types of containers including syringes. Both the patient care system 20 and the fluid supplies 38, 40, 42, and 44 are mounted to a roller stand, IV pole 46, table top, etc.

A separate infusion pump 22, 24, 26, and 28 is used to infuse each of the fluids of the fluid supplies into the patient. The infusion pumps are flow control devices that will act on the respective fluid line to move the fluid from the fluid supply through the fluid line to the patient 48. Because individual pumps are used, each can be individually set to the pumping or operating parameters required for infusing the particular medical fluid from the respective fluid supply into the patient at the particular rate prescribed for that fluid by the physician. Such medical fluids may include drugs or nutrients or other fluids.

Fluid supplies 38, 40, 42, and 44 are each coupled to an electronic data tag 81, 83, 85, and 87, respectively, or to an electronic transmitter. Any device or component associated with the infusion system may be equipped with an electronic data tag, reader, or transmitter.

Typically, medical fluid administration sets have more parts than are shown in FIG. 1. Many have check valves, drip chambers, valves with injection ports, connectors, and other devices well known to those skilled in the art. These other devices have not been included in the drawings so as to preserve clarity of illustration.

Figure 2:
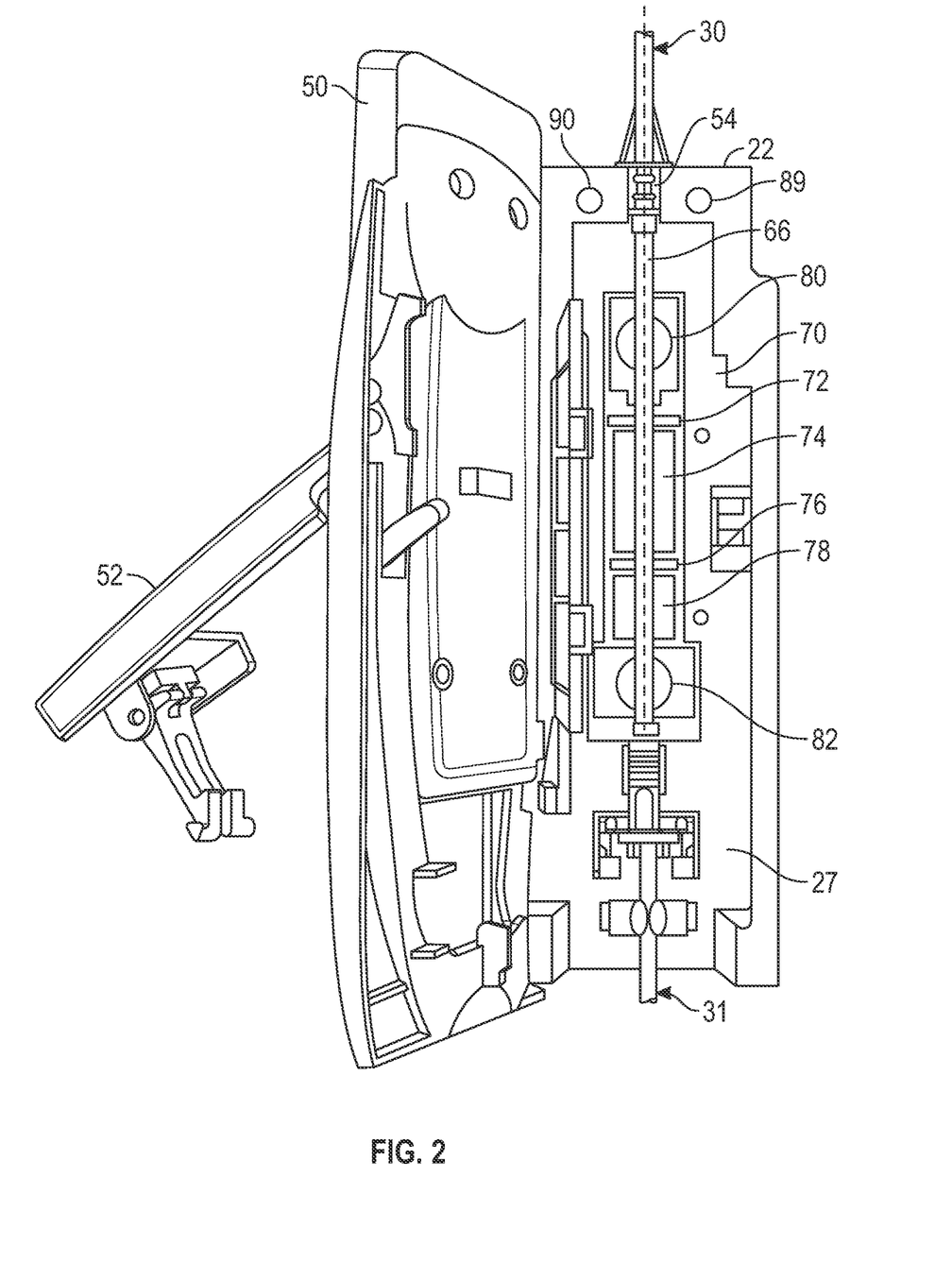
FIG. 2 depicts a perspective view of one of the fluid infusion pumps of FIG. 1, according to aspects of the disclosure.

Turning now to FIG. 2, an infusion pump 22 having a body 27 is shown in perspective view with the front door 50 open, showing the upstream fluid line 30 and downstream fluid line 31 in operative engagement with the pump 22. The infusion pump 22 directly acts on a tube 66 that connects the upstream fluid line 30 to the downstream fluid line 31 to form a continuous fluid conduit, extending from the respective fluid supply 38 to the patient 48 (FIG. 1), through which fluid is acted upon by the infusion pump 22 to move fluid downstream to the patient 48. Specifically, a pumping mechanism 70 acts as the flow control device of the infusion pump 22 to move fluid though the conduit. The upstream and downstream fluid lines 30, 31 and/or tube 66 may be coupled to a pump cassette or cartridge that is configured to be coupled to the infusion pump 22.

The type of pumping mechanism may vary and may be for example, a multiple finger pumping mechanism. For example, the pumping mechanism may be of the "four finger" type and includes an upstream occluding finger 72, a primary pumping finger 74, a downstream occluding finger 76, and a secondary pumping finger 78. The "four finger" pumping mechanism and mechanisms used in other linear peristaltic pumps operate by sequentially pressing on a segment of the fluid conduit by means of the cam-following pumping fingers and occluding fingers 72, 74, 76, and 78. The pressure is applied in sequential locations of the conduit, beginning at the upstream end of the pumping mechanism and working toward the downstream end. At least one finger is always pressing hard enough to occlude the conduit. As a practical matter, one finger does not retract from occluding the tubing until the next one in sequence has already occluded the tubing, thus at no time is there a direct fluid path from the fluid supply to the patient. The operation of peristaltic pumps including four finger pumps is well known to those skilled in the art and no further operational details are provided here.

FIG. 2 further shows a downstream pressure sensor 82 included in the pump 22 at a downstream location with respect to the pumping mechanism. The downstream pressure sensor 82 is mounted to the flow control device 70 and is located adjacent and downstream in relation to the flow control device 70. The downstream pressure sensor 82 is located downstream from the flow control device 70, that is, at a location between the patient 48 (FIG. 1) and the flow control device 70, so that the connection of the correct fluid supply 38, 40, 42, and 44 with the correct pump 22, 24, 26, and 28 may be verified before any fluid is pumped to the patient 48.

With reference still to FIG. 2, an upstream pressure sensor 80 may also be included in the pump 22. The upstream pressure sensor 80 is assigned to the flow control device or pumping mechanism 70 and, in this embodiment, is further provided as an integral part of the pump 22. It is mounted to the flow control device 70 and is located adjacent and upstream in relation to the flow control device 70. The upstream pressure sensor 80 is located upstream from the flow control device 70, that is, at a location between the fluid supply 38 (FIG. 1) and the flow control device 70, so that the connection of the correct fluid supply 38, 40, 42, and 44 with the correct pump 22, 24, 26, and 28 may be verified before any fluid is pumped to the patient 48.

The pump 22 or a portion of the pump 22 may also be equipped with an electronic data tag or data transmitter. For example, as shown in FIG. 2, pump 22 may be equipped with a data tag 89 or a reader device 90 for providing or receiving infusion data. The data reader devices may include RFID readers (or receivers) or other wireless devices that are compatible with the data tags associated with the fluid containers. A data transmitter may transmit interrogation signals to the electronic data tags 81, 83, 85, 87 associated with the fluid containers 38, 40, 42, and 44 for obtaining infusion data from those tags. Although referred to as data transmitting devices or RFID tags or RFID transponders, data transmitting devices may also receive or read data and may also be writable.

Typically, medical tubing is a disposable product that is used once and then discarded. The medical tubing may be formed from any suitable material, (e.g., soft PVC, silicone, TPV (EPDM+PP), TPU, TPS (SBS /SEBS /SIS /SEPS) and its blending with polyolefin, TPEE (polyether ester) rubber). As shown in FIG. 2, medical tubing 66 may be inserted into or otherwise engaged by pump 22. Pump 22 may include any of Large Volume, patient-controlled analgesia (PCA), ambulatory pump or insulin pump that drive tubing segment (s) to deliver medication or nutrients into a patient's body in controlled amounts. The medical tubing 66 is compressed when the pump door 50 is closed. With the pump door 50 closed, the medical tubing 66 is constrained within a gap 54 and directly contacted by the upstream force sensor 80. As discussed above, there are many sources of variation in measuring the force on the medical tubing 66 by the sensor 80.

According to aspects of the disclosure, correct operation of infusion pump valving may be measuring the reaction force from the tubing when the tubing is being compressed. For example, a force sensor assembly may measure the reaction force and then compare the measured force to known values to determine if the valving is operating as expected.

Figure 3:
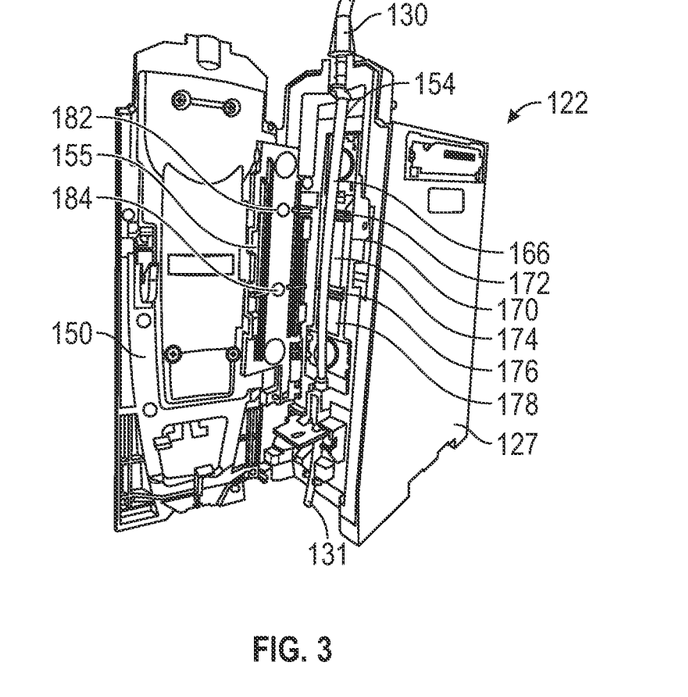
FIG. 3 depicts a perspective view of a fluid infusion pump with a force sensor system, according to aspects of the disclosure.
Figure 4:
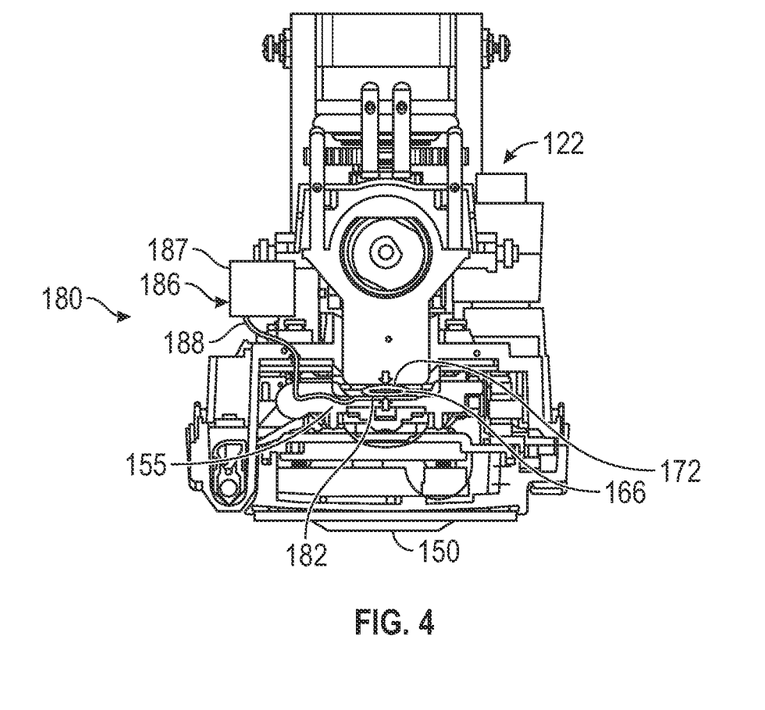
FIG. 4 depicts a cross-sectional top view of the fluid infusion pump of FIG. 3, according to aspects of the disclosure.
Figure 5:
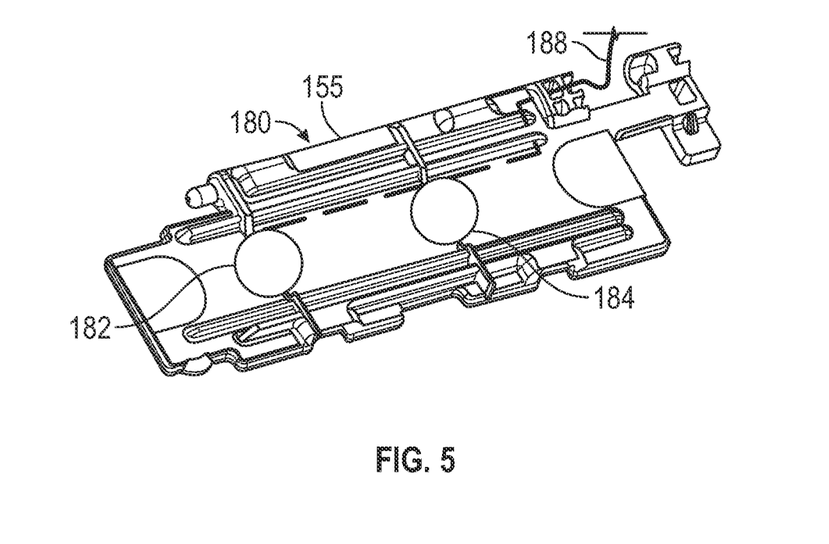
FIG. 5 depicts a perspective view of a platen assembly, according to aspects of the disclosure.

As shown in FIGS. 3 to 5, an infusion pump 122 having a body 127 is shown in perspective view with the front door 150 open, showing the upstream fluid line 130 and downstream fluid line 131 in operative engagement with the infusion pump 122. The infusion pump 122 directly acts on a tube 166 that is disposed within a tube pathway 154 and connects the upstream fluid line 130 to the downstream fluid line 131 to form a continuous fluid conduit. The continuous fluid conduit may extend from the fluid supply 38 (FIG. 1) to the patient 48, through which fluid is acted upon by the infusion pump 122 to move fluid downstream to the patient 48. Specifically, a pumping mechanism 170 acts as the flow control device of the pump to move fluid though the conduit. The upstream and downstream fluid lines 130, 131 and/or tube 166 may be coupled to a pump cassette or cartridge that is configured to be coupled to the infusion pump 122.

The infusion pump 122 includes a platen 155 as a static member and the pumping mechanism 170 as a moving member that compresses the tube 166 against the platen 155 to produce pinching and to seal the fluid pathway. The pumping mechanism 170 includes an upper occluder valve 172, a primary pumping finger 174, a lower occluder valve 176, and a secondary pumping finger 178.

A force sensing assembly 180 may be disposed at least in part on the platen 155. The force sensing assembly 180 includes an upper occlusion sensor 182 and a lower occlusion sensor 184 (e.g., force sensors). The upper and lower occlusion sensors 182, 184 are positioned on the platen 155 to be adjacent (e.g. across from) the upper and lower occluder valves 172, 176, respectively when the platen 155 is in a closed position covering the pumping mechanism 170. Thus, the tube 166 is sandwiched or engaged between the platen 155 and the pumping mechanism 170. The force sensing assembly 180 is configured to be unobtrusive and not create an uneven surface that could prevent the proper pinching of the tube 166. Here, the upper and lower occlusion sensors 182, 184 are each a piezo-resistive film element that produces a generally smooth and unobtrusive surface.

In some aspects of the disclosure, the force sensing assembly 180 is coupled to a processor 186 via wiring 188 or other coupling (e.g., circuitry, wireless). The processor 186 provides modulation and signal conditioning to provide an intelligible signal to be used by the infusion pump 122 software to determine the operating state of the upper and lower occluder valves 172, 176, and then make a decision as to whether or not to stop the infusion pump 122 and/or generate an alarm notifying a user of an abnormal condition.

As shown in FIG. 4, the processor 186 may be enclosed within a housing 187 disposed on an external portion of the infusion pump 122. In aspects of the disclosure, the processor 186 may be integrated with a processor of the infusion pump 122 and the processor 186 may be the main processor that runs the infusion pump 122. In aspects of the disclosure, the force sensing assembly 180 may be an integral component of the infusion pump 122 in which the infusion pump 122 processor(s) are configured to run operations of the infusion pump 122 and to provide the force sensing measurements and calculations based on the force sensing assembly 180. In aspects of the disclosure, the force sensing assembly 180 may be an add-on component configured to work with any type of infusion pump. Here, the add-on force sensing assembly 180 may include a replacement platen 155 that is preconfigured with the upper and lower occlusion sensors 182, 184 and the wiring 188, as well as the housing 187 that contains the processor 186. The housing 187 may be configured to couple with any infusion pump (e.g., infusion pump 122) via any desired coupling (e.g., clip on, screw on, stick on). Thus, the upper and lower occlusion sensors 182, 184 may be integrated in to the platen 155 and measure the reaction force from the tube 166 when the corresponding upper and lower occluder valves 172, 176 are actuated.

Figure 6:
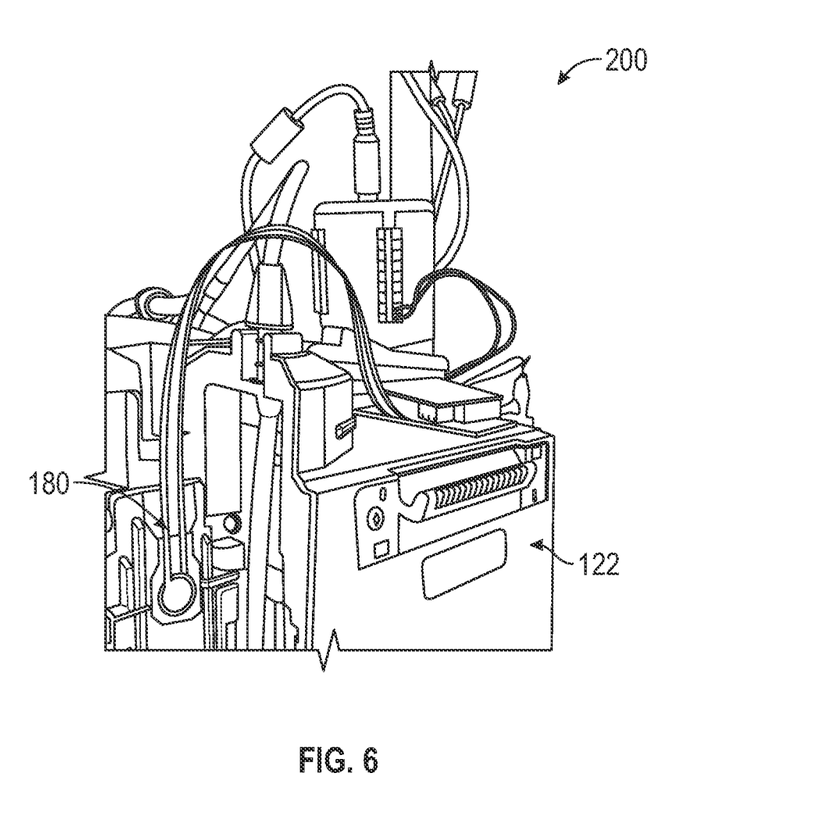
FIG. 6 depicts a perspective view of a test system of a fluid infusion pump with a force sensor system, according to aspects of the disclosure.

FIG. 6 depicts a perspective view of an example system including a fluid infusion pump with a force sensor system, according to aspects of the disclosure. The system 200 illustrates a configuration of features including the force sensing assembly 180 of the infusion pump 122. The configuration in FIG. 6 illustrates how a force sensing assembly 180 may be added to the infusion pump 122. For example, the force sensing assembly 180 may include a force sensing disk that can be affixed to a pumping platen on a door of the infusion pump 122. The force sensing disk may include a conductive element to receive power or data from a controlling device. The conductive element may additionally or alternatively be used to transmit force data generated by the force sensing disk to the controlling device.

Figure 7:
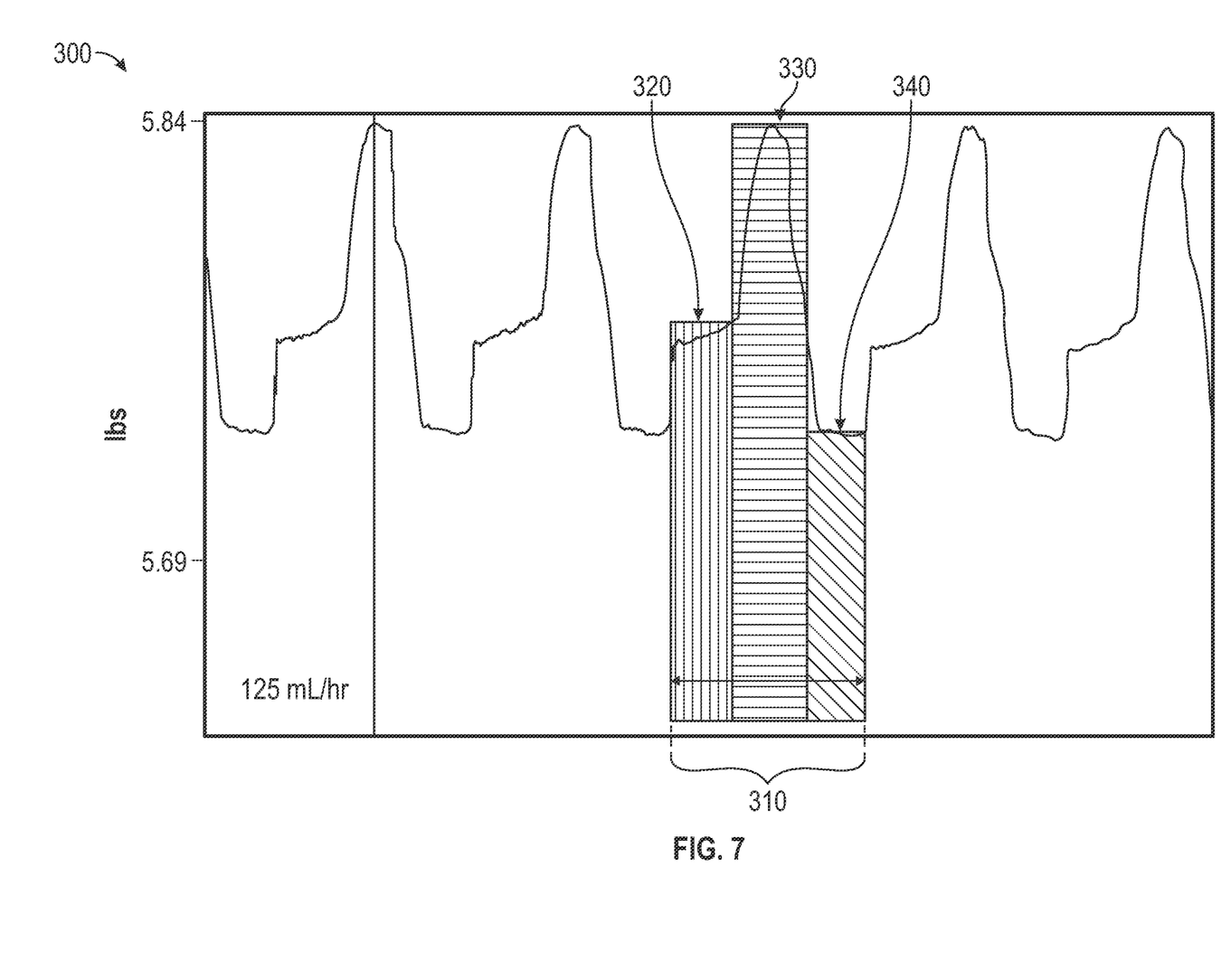
FIG. 7 is a graphical representation of force test results from the test system of FIG. 6, according to aspects of the disclosure.

FIG. 7 is a graphical representation of force test results from the test system of FIG. 6, according to aspects of the disclosure. A test system such as the test system 200 may be utilized to test the force sensing assembly 180 of the infusion pump 122. Testing with the test system 200 provides the graphical representation or curve 300 of force test results of the typical force signal over time for the infusion pump 122 operating at a nominal flow rate of 125 mL/hr. From this signal information the upper occluder valve 172 force as well as the operation of the primary pumping finger 174 can be discerned. The force test results may be compared to an expected value or range of values to detect variations from the expected value(s).

For example, a pump cycle 310 of the curve 300 has a first portion 320 in which the upper occluder valve 172 is closed, yielding a force of 2.4 lbf. A second portion 330 shows the additional force from the primary pumping finger 174 being fully extended while the upper occluder valve 172 is closed, yielding a total force of 5.7 lbf. A third portion 340 shows when the upper occluder valve 172 is open with the IV set (e.g., tube 166) loaded and the front door 150 and platen 155 are closed, yielding a force of 0.95 lbf. Here the IV set has a fluid pressure of approximately 1 psi. Thus, the forces are a result of a combination of fluid pressure, contact surface area of the tube 166, and close proximity of the upper occlusion sensor 182 to the primary pumping finger 174. Here, the detected or measured force value may indicate a failed upper or lower occluder valve 172, 176 or a broken platen 155.

The shape of the curve 300 can also be used to gather information about the condition of the tube 166, since the rate of change of compression and relaxation may also provide information on whether the tube 166 is the correct thickness, and if the material elastic properties of the tube 166 are not what is expected. Thus, the detected or measured force value may detect incomplete occlusion of the tube 166 as a result of the tube 166 being improperly positioned or having tube dimensions outside of the specified range.

Using an artificial intelligence (AI) or machine learning algorithm, the curve 300 shape information can also be compared against previous curves from the instrument (e.g., infusion pump 122), or compared to a population of infusion pumps in the field, to identify other abnormal conditions such as wear on the pumping mechanism 170. This can be used as a predictive measure to identify infusion pumps that should be serviced, or taken out of use, prior to a failure occurring.

Figure 8:
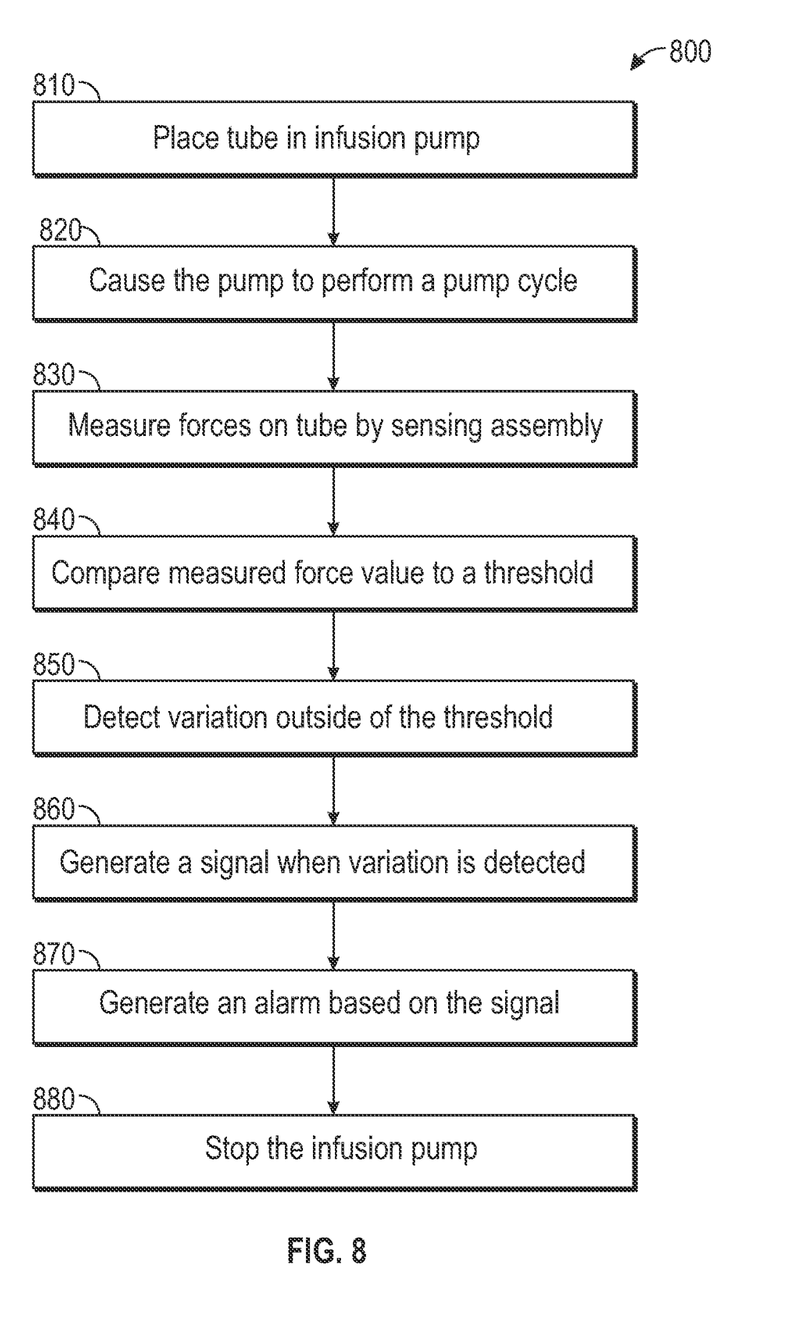
FIG. 8 depicts a flow diagram of a method of using a fluid infusion pump with a force sensor system, according to aspects of the disclosure.

FIG. 8 shows a method 800 of operating an infusion pump with a force sensing assembly. The example method 800 may be performed in whole or in part by one or more of the devices described in this application such those shown in the patient care system 20 of FIG. 1. In some implementations, all or part of the method may be performed by a remote device receiving input messages from and providing output messages to other devices, such as those included in the patient care system 20 of FIG. 1 or another device accessible by one or more devices included in the patient care system 20.

In step 810, tubing (e.g., tube 166) is placed or disposed in a fluid flow pathway of an infusion pump (e.g., infusion pump 122). For example, tubing may be inserted into a fluid flow pathway of an open infusion pump and a door (e.g., front door 150) of the infusion pump may then be closed to secure the tubing within the fluid flow pathway of the infusion pump between a platen (e.g., platen 155) and a pumping component (e.g., pumping mechanism 170). The infusion pump is cycled in step 820 (e.g., pump cycle 310). For example, the infusion pump may cause a compression force to squeeze any or all of the tubing in the fluid flow pathway, causing the fluid in the tubing to flow out of the tubing exiting the infusion pump. The compression force may be a recurring force where each compression is a pump cycle. In step 830, forces on the tubing during the pump cycle are measured (e.g., first portion 320, second portion 330, third portion 340) by a sensing assembly (e.g., force sensing assembly 180).

In step 840, the measured force is compared to an established occlusion force value threshold by a processor (e.g., processor 186). For example, a measured force may be compared against an expected value or range of values based on the pump specifications and the tube specifications. A variation outside of the established occlusion force value threshold is detected by the same or another processor (e.g., processor 186, infusion pump 122 processor) in step 850. In step 860, a variance signal is generated if a variation outside of the established occlusion force value threshold is detected. For example, the variance signal may be a fault signal due to less than full occlusion of the tube during an occlusion portion of the pump cycle, an improper positioning of the tube, improper dimensions of the tube, a broken or damaged platen and/or a broken or damaged occluder valve.

An alarm may be generated based on the generated variance signal in step 870. The alarm may be a human perceivable indication of the variance including one or more of audio, visual, or tactical representations. For example, an alarm may be generated on a display of the infusion pump and/or on a user device.

In some implementations, it may be desirable to adjust the operation of the pump based on the variance signal. The adjustment may include generating a control message to adjust one or more elements of the infusion pump or associated patient care system. For example, in step 880, the infusion pump is stopped based on the generated variance signal. For example, the software of the infusion pump may automatically stop the pump upon generation or receipt of the variance signal. In another example, the infusion pump may be manually stopped by a user based on receiving the alarm.

Figure 9:
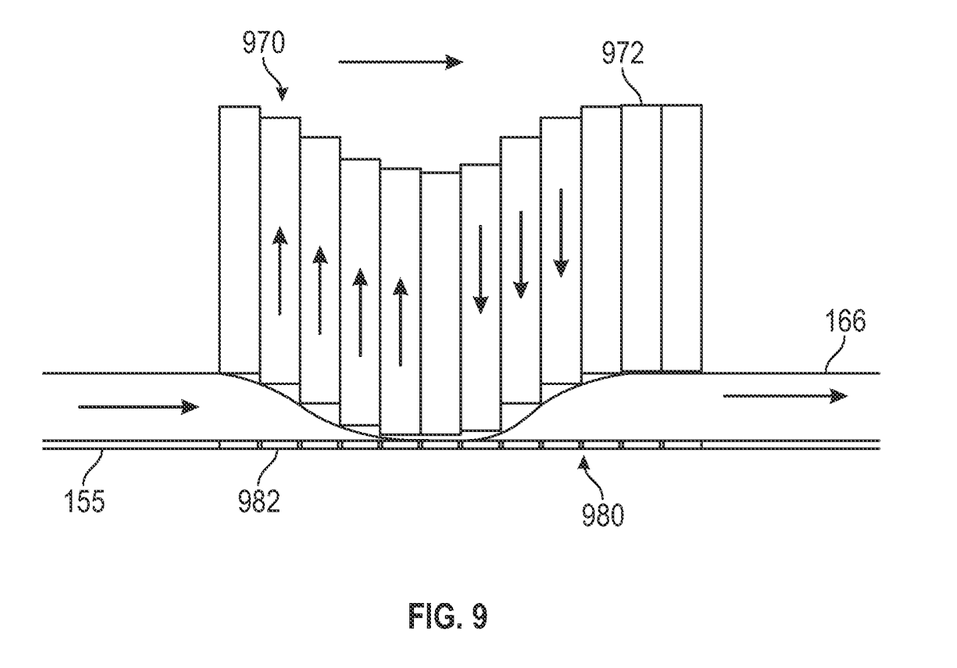
FIG. 9 depicts a front schematic view of a force sensor system, according to aspects of the disclosure.

As discussed above, the type of pumping mechanism may vary and may be for example, a multiple finger pumping mechanism having less or more fingers than a "four finger" configuration. For example, as shown in FIG. 9, the pump mechanism may be a linear peristaltic mechanism 970 having twelve fingers 972 (e.g., valve, occluder). A force sensing assembly 980 may be disposed at least in part on the pump platen (e.g., platen 155). The force sensing assembly 980 may include one or more occlusion sensors 982. For example, twelve occlusion sensors 982 may be positioned on the platen 155 to be adjacent (e.g. across from) corresponding fingers 972 when the platen 155 is in a closed position covering the pumping mechanism 970. Any other configuration of occlusion sensors may be provided. For example, one long occlusion sensor may cover the length of the twelve fingers 972 so that each finger 972 is positioned across from a different portion of the single occlusion sensor 982. A tube (e.g., tube 166) is sandwiched or engaged between the platen 155 and the pumping mechanism 970. The force sensing assembly 980 is configured to be unobtrusive and not create an uneven surface that could prevent the proper pinching of the tube 166. Here, the occlusion sensors 982 may each be a piezo-resistive film element that produces a generally smooth and unobtrusive surface. The force sensing assembly 980 may measure the resultant occlusion force as it travels along the length of the tube 166. The force measurement may then be compared to an acceptable force level to determine if the system is performing satisfactorily.

Variations of devices and method steps discussed above may be provided, according to aspects of the disclosure. For example, a controller may include a processor configured by specific computer-executable instructions to at least receive, from the force sensor, a first force measurement value, determine the first force measurement value corresponds to a force value threshold, generate a control message based at least on the first force measurement value, and cause the infusion pump associated with the occlusion sensor to adjust operation by at least transmitting the control message to the infusion pump. The controller may also receive, from the force sensor or the infusion pump, an identifier for a fluid infused by the pump cycle and retrieve, from a data store, the force value threshold based at least in part on the identifier for the fluid. The controller may also receive, from the sensor or the infusion pump, an identifier for tubing used to infuse a fluid during the pump cycle and retrieve, from a data store, the force value threshold based at least in part on the identifier for the tubing. The controller may also generate the control message by at least one of including a first value in the control message to adjust an output element of the infusion pump to present a human perceivable indication of a potential error and including a second value in the control message to adjust a pumping element of the infusion pump to prevent additional pumping cycles, wherein the pumping element includes at least one of a power source, a motor, a pumping finger, or an safety valve.

As another example, a transceiver (e.g., infusion pump transceiver) may be included for exchanging messages with a controller. A non-transitory computer-readable data store may be configured to store specific computer-executable instructions and a processor may be in communication with the non-transitory computer-readable data store. The processor may be configured to execute the computer-executable instructions to at least cause the transceiver to transmit a first message to the controller, the first message including a force measurement generated by the force sensor, receive, from the controller, a control message for adjusting an operational state of at least one hardware element of the infusion device, and adjust the operational state of the at least one hardware element based at least in part on the control message.

As used herein, the terms "control" or "controlling" encompass a wide variety of actions. For example, "controlling" a device may include transmitting one or more messages to adjust an operational state or functional element of the device. The message may include specific instructions to be executed by a processor of the device to manifest the change. The "controlling" may include storing a value in a location of a storage device for subsequent retrieval by the device to be controlled, transmitting a value directly to the device to be controlled via at least one wired or wireless communication medium, transmitting or storing a reference to a value, and the like. For example, a control message may include a value to adjust a level of power from a power source of the controlled device. As another example, a control message may activate or deactivate a structural element of the controlled device such as a light, audio playback, a motor, a lock, a pump, a display, or other component of a device described herein. "Controlling" may include indirect control of the device by adjusting a configuration value used by the controlled device. For example, the control message may include a threshold value for a device characteristic (e.g., temperature, rate, frequency, etc.). The threshold value may be stored in a memory location and referred to by the controlled device during operation.

According to some aspects of the disclosure, a pump assembly includes a fluid flow pump, a tubing pathway configured to receive a fluid tube and a tubing dimension measurement assembly. The tubing dimension measurement assembly includes a processor, an emitter spaced from the tubing pathway and configured to generate an emission into the tubing pathway, and a collector spaced from the tubing pathway, the collector disposed to receive the emission from the emitter, wherein the tubing dimension measurement assembly is further configured to measure an outside diameter (OD) of a tube received in the pathway, wherein said measurement is based at least in part on the emission.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, inserting and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

In any embodiment, data can be forwarded to a "remote" device or location," where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like.

Some embodiments include implementation on a single computer, or across a network of computers, or across networks of networks of computers, for example, across a network cloud, across a local area network, on hand-held computer devices, etc. The computers may be physical machines or virtual machines hosted by other computers. In certain embodiments, one or more of the steps described herein are implemented on a computer program(s). Such computer programs execute one or more of the steps described herein. In some embodiments, implementations of the subject method include various data structures, categories, and modifiers described herein, encoded on computer-readable medium(s) and transmissible over communications network(s).

Software, web, internet, cloud, or other storage and computer network implementations of the present invention could be accomplished with standardized programming techniques specifically adapted to cause one or more device to perform the various assigning, calculating, identifying, scoring, accessing, generating or discarding steps described.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. An infusion pump assembly, comprising:
   a body;
   a door;
   a tubing pathway configured to receive a fluid tube; and
   a pumping mechanism having an occluder valve;
   a platen comprising a unitary structure; and
   a force sensing assembly including:
      a processor; and
      an occlusion sensor coupled to the processor, the occlusion sensor disposed directly on the platen in a position opposed to the occluder valve when the platen is closed and secures the fluid tube between the platen and the pumping mechanism,
      wherein the force sensing assembly is configured to measure one or more forces exerted on the fluid tube during a pump cycle.

2. The infusion pump assembly of claim 1, wherein the occlusion sensor is coupled to the processer by wire.

3. The infusion pump assembly of claim 1, wherein the processor is disposed within a housing that is coupled to an external portion of the body.

4. The infusion pump assembly of claim 1, wherein the occlusion sensor comprises a piezo-resistive film element.

5. The infusion pump assembly of claim 1, wherein the pumping mechanism comprises upper and lower occluder valves and the force sensing assembly comprises upper and lower occlusion sensors correspondingly disposed opposed to the upper and lower occluder valves.

6. The infusion pump assembly of claim 1, wherein the processor is configured to provide modulation and signal conditioning to be used by infusion pump software.

7. The infusion pump assembly of claim 1, wherein the processor controls operation of the infusion pump assembly.

8. The infusion pump assembly of claim 1, wherein the force sensing assembly is configured to measure a force on the fluid tube when the occluder valve is closed.

9. The infusion pump assembly of claim 1, wherein the pumping mechanism comprises a pumping finger, wherein the force sensing assembly is configured to measure a force on the fluid tube when the pumping finger is fully extended and the occluder valve is closed.

10. The infusion pump assembly of claim 1, wherein the force sensing assembly is configured to measure a force on the fluid tube when the occluder valve is open.

11. The infusion pump assembly of claim 1, wherein the infusion pump assembly is configured to detect a failure of the occluder valve based on the one or more forces measured by the force sensing assembly.

12. The infusion pump assembly of claim 1, wherein the infusion pump assembly is configured to detect that the platen is broken based on the one or more forces measured by the force sensing assembly.

13. The infusion pump assembly of claim 1, wherein the infusion pump assembly is configured to detect incomplete occlusion of the tube based on the one or more forces measured by the force sensing assembly, wherein the incomplete occlusion is caused by one of an improper positioning of the tube in the tubing pathway and tube dimensions outside of a specified range.

14. The infusion pump assembly of claim 1, wherein the infusion pump assembly is configured to generate a force signal over time curve.

15. The infusion pump assembly of claim 14, wherein the infusion pump assembly is configured to compare the generated force signal over time curve against one or more previously generated force signal over time curves for the infusion pump assembly and to identify an abnormal condition of the infusion pump assembly based on the comparison.

16. The infusion pump assembly of claim 1, wherein the infusion pump assembly is configured to one of generate an alarm and automatically stop the infusion pump assembly based on a signal generated by the force sensing assembly.

17. A force sensing assembly for an infusion pump, comprising:
   a platen comprising a unitary structure;
   upper and lower occlusion sensors each disposed directly on the platen in a position configured to oppose a corresponding upper and lower occluder valve of an infusion pump when the platen is in a closed position and in contact with a fluid tube; and
   a processor electronically coupled to the occlusion sensor, wherein the force sensing assembly is configured to measure one or more forces exerted on the fluid tube disposed between the upper and lower occlusion sensors and the upper and lower occluder valves during a pump cycle.

18. The force sensing assembly of claim 17, wherein the upper and lower occlusion sensors each comprise a piezo-resistive film element.

* * * * *